US011436471B2

(12) United States Patent
Nishida et al.

(10) Patent No.: US 11,436,471 B2
(45) Date of Patent: Sep. 6, 2022

(54) PREDICTION MODEL SHARING METHOD AND PREDICTION MODEL SHARING SYSTEM

(71) Applicant: Panasonic Intellectual Property Corporation of America, Torrance, CA (US)

(72) Inventors: Naohisa Nishida, Osaka (JP); Yuji Unagami, Osaka (JP); Tatsumi Oba, Osaka (JP); Ryo Kato, Osaka (JP); Shota Yamada, Tokyo (JP); Nuttapong Attrapadung, Saitama (JP); Tadanori Teruya, Tokyo (JP); Takahiro Matsuda, Tokyo (JP); Goichiro Hanaoka, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 937 days.

(21) Appl. No.: 16/149,254

(22) Filed: Oct. 2, 2018

(65) Prior Publication Data

US 2019/0114530 A1  Apr. 18, 2019

(30) Foreign Application Priority Data

Oct. 13, 2017 (JP) .............................. JP2017-199582
Jun. 7, 2018 (JP) .............................. JP2018-109618

(51) Int. Cl.
  *G06N 3/04* (2006.01)
  *H04L 9/08* (2006.01)
  *G06N 3/08* (2006.01)

(52) U.S. Cl.
  CPC ................. *G06N 3/04* (2013.01); *G06N 3/08* (2013.01); *H04L 9/085* (2013.01); *H04L 2209/46* (2013.01)

(58) Field of Classification Search
  CPC . G06N 3/04; G06N 3/08; H04L 9/085; H04L 2209/46; G06Q 10/04; G06F 21/14
  See application file for complete search history.

(56) References Cited

U.S. PATENT DOCUMENTS 10,452,974 B1 * 10/2019 Cosic ........................ G06N 3/08
10,748,217 B1 * 8/2020 Ross ...................... G06V 40/10
(Continued)

FOREIGN PATENT DOCUMENTS

CN        107070638 B  *  6/2020
EP        3461054 A1   *  3/2019 ............. H04L 9/008
(Continued)

OTHER PUBLICATIONS

"SaghaianNejadEsfahani, (Privacy Protected Image Denoising With Secret Shares), 2012" (Year: 2012).*
(Continued)

*Primary Examiner* — Alexey Shmatov
*Assistant Examiner* — Michael Aaron Merabi
(74) *Attorney, Agent, or Firm* — Greenblum & Bernstein, P.L.C.

(57) ABSTRACT

A method of obtaining a shared prediction model is provided. The method includes: obtaining a prediction model as a neural network; converting each negative numerical value in a plurality of parameters included in the prediction model to a positive numerical value to obtain a converted prediction model; and sharing the converted prediction model by a secret sharing method to obtain shared prediction models while concealing an input data.

23 Claims, 11 Drawing Sheets

(56) References Cited

U.S. PATENT DOCUMENTS

| | | | | |
|---|---|---|---|---|
| 10,839,286 | B2* | 11/2020 | Fraser | G06N 3/04 |
| 11,092,690 | B1* | 8/2021 | Meier | G01S 17/89 |
| 2017/0372201 | A1* | 12/2017 | Gupta | G06N 3/084 |
| 2018/0011996 | A1* | 1/2018 | Dolev | H04L 9/085 |
| 2018/0268283 | A1* | 9/2018 | Gilad-Bachrach | G06N 5/003 |
| 2019/0212986 | A1* | 7/2019 | Araki | G06F 7/4824 |
| 2020/0218964 | A1* | 7/2020 | Nakahara | G06N 3/08 |
| 2020/0242466 | A1* | 7/2020 | Mohassel | G06F 21/6254 |
| 2020/0279166 | A1* | 9/2020 | Yamada | G06K 9/4642 |

FOREIGN PATENT DOCUMENTS

| | | |
|---|---|---|
| WO | 2016/113738 A1 | 7/2016 |
| WO | 2018/174873 A1 | 9/2018 |

OTHER PUBLICATIONS

Payman Mohassel et al., "SecureML: A System for Scalable Privacy-Preserving Machine Learning", IEEE Symposium on Security and Privacy, May 22-26, 2017 (https://eprint.iacr.org/2017/396.pdf).

Nathan Dowlin et al., "CryptoNets: Applying Neural Networks to Encrypted Data with High Throughput and Accuracy", Proceedings of the 33rd International Conference on Machine Learning, JMLR 48: 201-210, 2016 (http://proceedings.mlr.press/v48/gilad-bachrach16.pdf).

Adi Shamir, "How to share a secret", Communications of the ACM, vol. 22, Issue 11, pp. 612-613, Nov. 1979 (http://dl.acm.org/citation.cfm?id=359176).

Ronald Cramer et al., "Share Conversion, Pseudorandom Secret-Sharing and Applications to Secure Computation", Second Theory of Cryptography Conference, Feb. 10-12, 2005 (https://rd.springer.com/chapter/10.1007/978-3-540-30576-7_19).

Toshinori Araki et al., "High-Throughput Semi-Honest Secure Three-Party Computation with an Honest Majority", Proceedings of the 2016 ACM SIGSAC Conference on Computer and Communications Security, pp. 805-817, Oct. 24-28, 2016 (https://eprint.iacr.org/2016/768.pdf).

Takashi Nishide et al., "Multiparty Computation for Interval, Equality, and Comparison without Bit-Decomposition Protocol", Public Key Cryptography—PKC 2007, pp. 343-360, Apr. 16-20, 2007 (https://rd.springer.com/chapter/10.1007/978-3-540-71677-8_23).

Matthieu Courbariaux et al., "Binarized Neural Networks: Training Neural Networks with Weights and Activations Constrained to +1 or −1", Mar. 17, 2017 (https://arxiv.org/abs/1602.02830).

The Extended European Search Report dated Mar. 6, 2019 for the related European Patent Application No. 18199760.2.

Dahl, Morten, "Private Deep Learning with MPC," Apr. 2017, https://mortendahl.github.io/2017/04/17/private-deep-learning-with-mpe/, pp. 1-23.

Liu, Jian et al., "Oblivious Neural Network Predictions via MiniONN transformations," Cryptology ePrint Archive, Paper 2017/452, Aug. 2017, https://eprint.iacr.org/2017/452, pp. 1-16.

* cited by examiner

FIG. 9

| USER NAME | CHARACTERISTIC AMOUNT 1 | CHARACTERISTIC AMOUNT 2 | CHARACTERISTIC AMOUNT 3 |
|---|---|---|---|
| AAA | 12 | 345 | 6 |

FIG. 10

| TRANSMISSION DESTINATION | CHARACTERISTIC AMOUNT 1 | CHARACTERISTIC AMOUNT 2 | CHARACTERISTIC AMOUNT 3 |
|---|---|---|---|
| DATA COMPUTING DEVICE 300 | 38 | 448 | 62 |
| DATA COMPUTING DEVICE 310 | 64 | 551 | 118 |
| DATA COMPUTING DEVICE 320 | 90 | 654 | 174 |

FIG. 11

$$y = \frac{\gamma}{\sqrt{\sigma^2 + \epsilon}} x + \left(\beta - \frac{\gamma\mu}{\sqrt{\sigma^2 + \epsilon}}\right) \quad \cdots \text{(EQUATION A)}$$

$$s = \frac{\gamma}{\sqrt{\sigma^2 + \epsilon}} \quad \cdots \text{(EQUATION B)}$$

$$t = \beta - \frac{\gamma\mu}{\sqrt{\sigma^2 + \epsilon}} \quad \cdots \text{(EQUATION C)}$$

FIG. 12

$\gamma$ : [−8.09   4.08   −6.86   −1.62   5.1]

$\sigma$ : [5.83   1.41   −8.32   0.89   1.74]

$\epsilon$ : [3.89]

$\beta$ : [−6.12   −0.42   7.8   4.55   −6.43]

$$\begin{bmatrix} -1 & 1 & 1 & -1 \\ 1 & 1 & -1 & -1 \\ 1 & 1 & -1 & 1 \end{bmatrix}$$

FIG. 16

$[s_1 \quad s_2 \quad s_3 \quad s_4] \circ [x_1 \quad x_2 \quad x_3 \quad x_4] + [t_1 \quad t_2 \quad t_3 \quad t_4]$ WHERE $\circ$ IS ELEMENT-WISE PRODUCT

PREDICTION MODEL SHARING METHOD AND PREDICTION MODEL SHARING SYSTEM

BACKGROUND

1. Technical Field

The present disclosure relates to a prediction model sharing method and a prediction model sharing system for executing prediction processing of a neural network while concealing contents with a secret sharing method.

2. Description of the Related Art

Recently, various companies have been providing services utilizing neural networks. The services using neural networks are, for example, a service for identifying a type of a subject from an uploaded image, a service for recommending a product that a user may like based on a purchase history of the user, and the like.

Such a service is required to protect privacy information of users because inputted information from the users, for example, inputted information of images uploaded by the users and the users' purchase histories often contains sensitive information. Thus, there is a need for a technique for the neural network to execute learning processing and prediction processing without requiring the user to disclose the privacy information to a service provider.

Also from the point of view of the service provider, there is a need to provide the service to the users while concealing information on know-how of the service as far as possible.

As a technique satisfying these two needs, there has been a conceivable approach which executes the prediction processing of the neural network with a secret calculation method that enables calculation while concealing data. The secret calculation method is a technique capable of concealing a calculation process and its result from an entity that stores data. For example, this method enables one to store data in a server managed by a third person, such as a cloud server, and to execute various kinds of computations on the stored data. Since the third person has no way to know the inputted data, the calculation process, or its result, analytical processing on sensitive information such as personal information can be outsourced. Specifically, Payman Mohassel and one other, "SecureML: A System for Scalable Privacy-Preserving Machine Learning," "IEEE Symposium on Security and Privacy 2017" (https://eprint.iacr.org/2017/396.pdf) (SecureML) and Ran Gilad-Bachrach and five others, "CryptoNets: Applying Neural Networks to Encrypted Data with High Throughput and Accuracy," (http://proceedings.mlr.press/v48/gilad-bachrach16.pdf) (CryptoNets) disclose the techniques of executing the prediction processing while concealing data.

SUMMARY

The above-described conventional techniques have needed further improvements.

In one general aspect, the techniques disclosed here feature a method including: obtaining a prediction model as a neural network; converting each negative numerical value in a plurality of parameters included in the prediction model to a positive numerical value to obtain a converted prediction model; and sharing the converted prediction model by a secret sharing method to obtain shared prediction models to be used for prediction processing while concealing an input data.

Further improvements can be implemented according to the present disclosure.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 is a diagram that illustrates an example of characteristic amounts in the embodiment;

FIG. 10 is a diagram that illustrates an example of shared characteristic amounts in the embodiment;

FIG. 11 is a diagram that illustrates an example of uniformization processing in the embodiment;

FIG. 12 is a diagram that illustrates an example of a prediction model in the embodiment;

FIG. 13A is a diagram that illustrates an example of the prediction model after previous calculation in the embodiment;

FIG. 13B is a diagram that illustrates an example of the prediction model after rounded off to an integer in the embodiment;

FIG. 13C is a diagram that illustrates an example of the prediction model after converting a negative integer to a positive integer in the embodiment;

FIG. 15 is a diagram that illustrates an example of weight matrices before conversion in the embodiment; and FIG. 16 is a diagram that illustrates an example of the uniformization processing in the embodiment.

Figure 1:
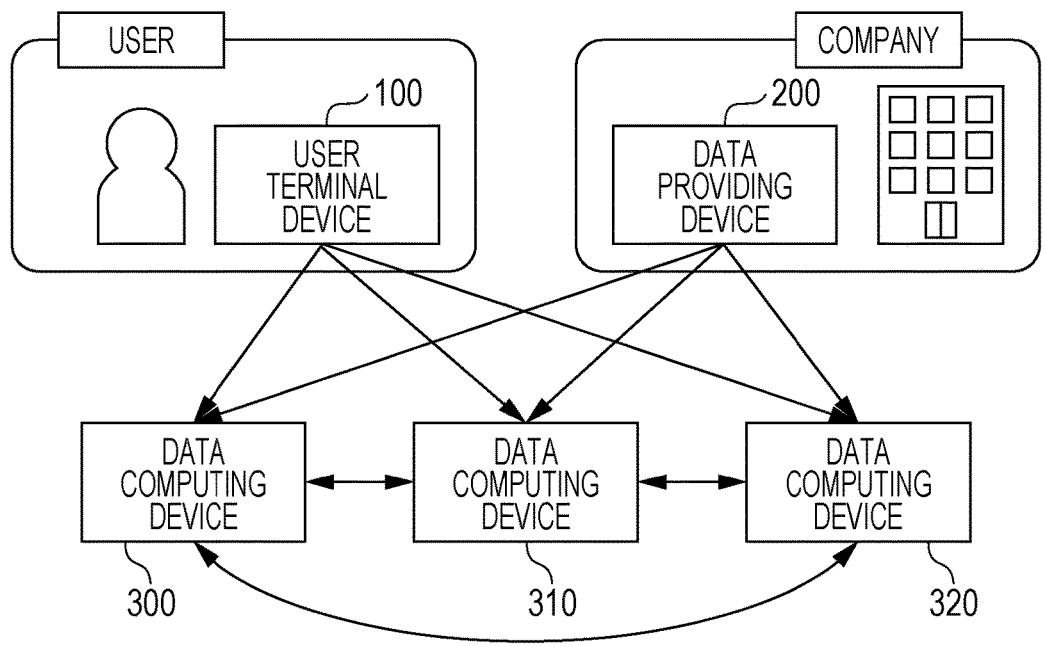
FIG. 1 is a diagram that illustrates an example of an overall configuration of a prediction model sharing system according to an embodiment.

DETAILED DESCRIPTION (Underlying Knowledge Forming Basis of the Present Disclosure)

Payman Mohassel et al. (SecureML) and Ran Gilad-Bachrach et al. (CryptoNets) have been disclosed as the methods of executing prediction computation of a neural network by using encrypted data. However, it is doubtful whether these methods are practically usable because they have low prediction accuracy and require a huge amount of calculation.

The present disclosure thus provides, for example, a prediction model sharing method, and a prediction model sharing system that can reduce decreases in prediction processing speed and the prediction accuracy while concealing inputs by implementing a neural network such as the Binarized Neural Networks with a secret calculation method.

An aspect of the present disclosure is described below.

A method according to one aspect of the present disclosure includes: obtaining a prediction model as a neural network; converting each negative numerical value in a plurality of parameters included in the prediction model to a positive numerical value to obtain a converted prediction model; and sharing the converted prediction model by a secret sharing method to obtain shared prediction models to be used for prediction processing while concealing an input data.

In this way, since all the parameters included in the prediction model are converted to positive numerical values, a secret sharing method can be applied as a method of sharing the prediction model. Thus, it is possible to reduce decreases in prediction processing speed and the prediction accuracy while concealing inputs.

For example, in the method according to one aspect of the present disclosure, the prediction model may be a binarized neural network including two values of 1 and −1 as the plurality of parameters.

In this way, since the binarized neural network is used as the prediction model, a time of calculation of matrix product computation can be shortened. Also, since the prediction model is the binarized neural network, processing of converting a negative numerical value to a positive numerical value included in the prediction model becomes easier. Thus, it is possible to reduce a decrease in the prediction processing speed.

For example, in the method according to one aspect of the present disclosure, the obtaining of the prediction model includes executing learning processing of the prediction model by using learning data collected in advance.

In this way, it is easier to create a prediction model appropriate for deriving a correct prediction result, and the prediction accuracy can be thus improved.

For example, in the method according to one aspect of the present disclosure, the converting includes converting each value with a decimal fraction in the plurality of parameters included in the prediction model, to an integer value.

The plurality of parameters including a decimal value cause complicated calculation and long calculation time. Even if the decimal value is converted to an integer, the calculation result to be obtained is the same. Thus, conversion of the decimal value to an integer value allows the calculation time in the prediction processing to be shortened while keeping the accuracy of the prediction processing. In addition, since a decimal value cannot be used in the secret sharing method, the decimal value has to be converted to an integer value. In this way, the converted prediction model can be shared by the secret sharing method.

For example, in the method according to one aspect of the present disclosure, the converting includes adding a random value used in the secret sharing method to each negative numerical value in the plurality of parameters included in the prediction model.

In general, the greater the numerical value of the parameter, the higher the prediction accuracy, and the smaller the numerical value, the higher the calculation speed. Thus, for example, a value of the random value used in the secret sharing method is determined in light of a balance of the prediction accuracy and the prediction speed and is added to a negative numerical value. In this way, use of the converted prediction model can reduce the decrease in the prediction accuracy and the prediction speed. In addition, since all the parameters included in the converted prediction model are represented by positive numerical values, the converted prediction model can be shared by the secret sharing method. Thus, the prediction processing can be executed while concealing an input.

For example, in the method according to one aspect of the present disclosure, the converting includes converting each numerical value in the plurality of parameters included in the prediction model to a pair including a sign part, indicating the sign of the numerical value by 0 or 1, and a numerical value part, indicating the absolute value of the numerical value.

For example, when one of the parameters included in the prediction model is −10, the conversion processing converts −10 to a pair of the sign part indicating a sign and the numerical value part indicating the absolute value of the numerical value (1, 10). In this way, since the negative numerical value −10 is converted to the pair of positive numerical values 1 and 10, the parameters included in the prediction model is represented only by positive numerical values. Thus, the converted prediction model can be shared by the secret sharing method by applying the conversion processing to the prediction model.

For example, in the method according to one aspect of the present disclosure, the converting includes generating a new parameter from a part of the plurality of parameters.

In this way, a part composed of the learned parameters included in the prediction model is calculated before sharing the prediction model, that is, before encrypting the prediction model. Since the learned parameters are fixed, the new parameter may be generated by calculating a part to be the fixed value before encrypting the prediction model. In this way, since amounts of calculation and communications can be less than a case of making the calculation after encrypting the prediction model, it is possible to improve the calculation speed in the prediction processing. Thus, the decrease in the processing speed can be reduced even when executing the prediction processing while concealing an input.

For example, the method according to one aspect of the present disclosure further includes: calculating a characteristic amount based on data obtained by sensing; and sharing the calculated characteristic amount by the secret sharing method to obtain shared characteristic amounts.

In this way, likewise the prediction model, sensitive information such as personal information obtained from the user by sensing can also be shared by the secret sharing method. Thus, according to the method of one aspect of the present disclosure, it is possible to execute the prediction processing while concealing an input (in this case, user information) to the prediction processing, that is, protecting privacy information on the user.

For example, the method according to one aspect of the present disclosure further includes: inputting the shared characteristic amounts to the shared prediction models to execute the prediction processing, in which the prediction processing includes non-linear processing in which when an input to the non-linear processing is 0 or a positive numerical value, the input is converted to 1, whereas when the input to the non-linear processing is a negative numerical value, the input is converted to a positive numerical value corresponding to −1.

In this way, the numerical value of the input can be converted so as to allow the converted numerical value to be within a range of a positive numerical value, which guarantees the prediction accuracy. Thus, it is possible to reduce the decreases in the prediction processing speed and the prediction accuracy.

A system according to one aspect of the present disclosure includes: a processor; and a memory including at least one set of instructions that, when executed by the processor, causes the processor to perform operations including: obtaining a prediction model as a neural network; converting a negative numerical value to a positive numerical value in a plurality of parameters included in the prediction model to obtain a converted prediction model; and sharing the converted prediction model by a secret sharing method to obtain a shared prediction model to be used for prediction processing while concealing an input data.

According to the system, since all the parameters included in the prediction model is converted to positive numerical values, the secret sharing method can be applied as a method of sharing the prediction model. Thus, it is possible to reduce the decreases in the prediction processing speed and the prediction accuracy while concealing an input.

Any of the later-described embodiments indicate a specific example of the present disclosure. Numerical values, shapes, constituents, steps, and the order of the steps indicated by the following embodiments are an example and do not intend to limit the present disclosure. In the constituents in the following embodiments, a constituent not included in the independent claim indicating the most generic concept is described as an arbitrary constituent. Drawings are not necessarily illustrated precisely. In each drawing, substantially the same configuration is denoted by the same reference numeral, and duplicated descriptions may be omitted or be simplified.

Without departing from the gist of the present disclosure, an embodiment with various modification that the skilled in the art conceives of and a different form composed of a combination of parts of the constituents of the embodiment are also included in a range of the present disclosure.

(Embodiment)

Hereinafter, a prediction model sharing method and a prediction model sharing system according to this embodiment are described with reference to the drawings.

[Prediction Model Sharing System]

The prediction model sharing system according to this embodiment is a prediction model sharing system for executing prediction processing while concealing inputs and includes a prediction model converting unit (or convertor), which converts a prediction model that is a neural network by converting a negative numerical value to a positive numerical value in multiple parameters included in the prediction model, and a prediction model sharing unit (or model sharer), which shares the converted prediction model by a secret sharing method.

In this embodiment, the prediction model sharing system further includes a characteristic amount calculating unit (or characteristic calculator), which calculates characteristic amounts based on data obtained by sensing, and a characteristic amount sharing unit (or characteristic sharer), which shares the calculated characteristic amounts by the secret sharing method.

In this embodiment, the prediction model sharing system further includes a prediction processing unit (or prediction processor), which inputs the shared characteristic amounts into the shared prediction models and executes the prediction processing with the shared prediction models.

[1. Configuration of Prediction Model Sharing System]

A configuration of the prediction model sharing system according to the embodiment of the present disclosure is described herein with reference to the drawings. In this description, the prediction model sharing system is a system that executes the prediction processing in an encrypted state with an encrypted prediction model (hereinafter, shared prediction model) and user information encrypted by the same method as the shared prediction model (hereinafter, shared characteristic amounts). Hereinafter, the prediction model sharing system is also referred to as a concealment prediction system. Hereinafter, sharing and encrypting are also referred to as concealing.

[1.1 Overall Configuration of Prediction Model Sharing System]

FIG. 1 is a diagram that illustrates an example of an overall configuration of a prediction model sharing system according to Embodiment 1 of the present disclosure. As illustrated in FIG. 1, the prediction model sharing system includes, for example, a user terminal device (or data terminal) 100, a data providing device 200 (or data provider), and data computing devices 300, 310 and 320. Communications between the devices may be at least any one of a wired Internet line, wireless communications, and private communications, for example.

In this case, each of the data computing devices 300, 310 and 320 is a single cloud server or a device included in a single cloud server.

In the prediction model sharing system, for example, data (hereinafter, prediction model) required by a company or an organization for the prediction processing is transmitted in a concealed state from the data providing device 200 to three cloud servers, that is, the data computing devices 300, 310 and 320. When a user uses a service of the concealment prediction system, the user transmits own information (hereinafter, characteristic amounts) in the concealed state from the user terminal device 100 to the data computing devices 300, 310 and 320 as the three cloud servers. The three cloud servers communicate with each other, and each cloud server utilizes the data obtained by other cloud servers to calculate a prediction result while concealing that data and then transmits the obtained prediction result to the user terminal device 100.

There may be one or more user terminal devices 100 and one or more data providing devices 200. In addition, although the prediction model sharing system in the example illustrated in FIG. 1 includes three data computing devices, the number of the data computing devices may be at least two. Details of the reason are described later. For now, a schematic description is provided. In the secret sharing method used in the present disclosure, the number of times of adding a random value used in the secret sharing method is increased according to the number of data pieces to be shared. Thus, since it is impossible to obtain the random value from one piece of shared data, at least two pieces of shared data are required. This means that the prediction results that are calculated while concealing the data are also in the concealed state, and thus two or more concealed prediction results are required to obtain decoded prediction results.

The communications between the devices constructing the prediction model sharing system may not be necessarily real-time communications. For example, the user terminal device 100 may collect the sensed user information or request commands for concealment prediction processing (hereinafter also referred to as prediction processing) to some extent and transmit them at once to the multiple data computing devices 300, 310, and 320.

[1.2 User Terminal Device]

Figure 2:
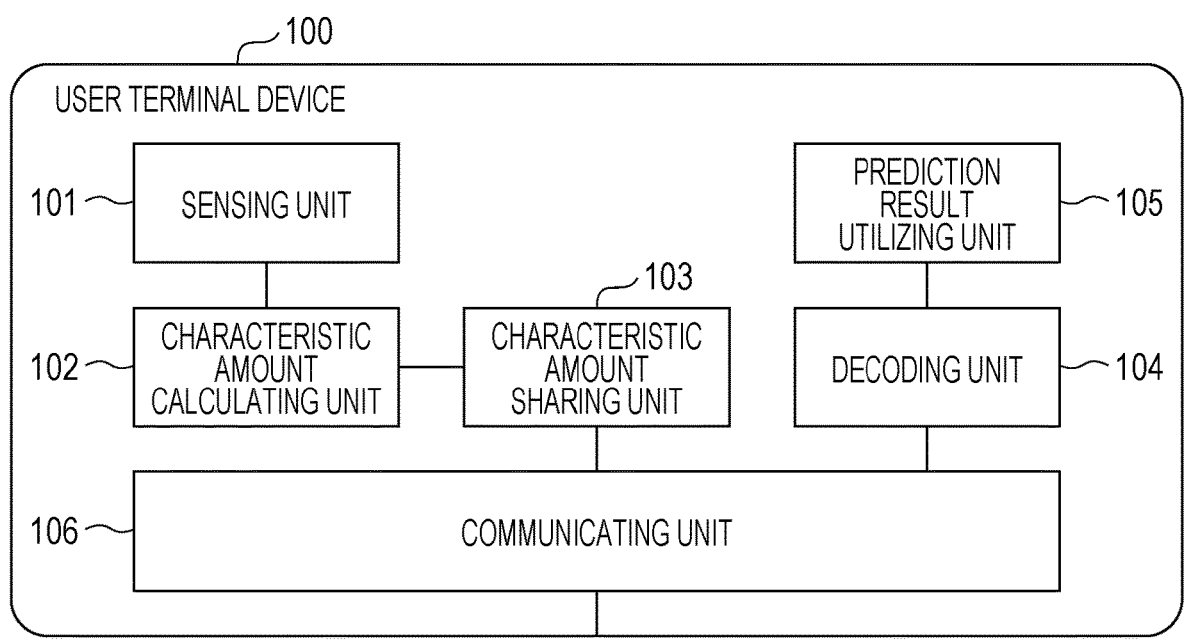
FIG. 2 is a diagram that illustrates an example of a configuration of a user terminal device in the embodiment.

FIG. 2 is a diagram that illustrates an example of a configuration of the user terminal device 100. The user terminal device 100 is configured to include a sensing unit 101, a characteristic amount calculating unit 102, a characteristic amount sharing unit 103, a decoding unit (decoder) 104, a prediction result utilizing unit 105, and a communicating unit (or communicator) 106. The user terminal device 100 is, for example, implemented in a computer or a mobile terminal provided with a processor (microprocessor), a memory, a sensor, a communication interface, and the like.

The user terminal device 100 senses information on the user such as blood pressure, heart rate, and CT scan information of the user, that is, privacy data, calculates characteristic amounts, and transmits them to the data computing devices 300, 310, and 320. The user terminal device 100 then requests the data computing devices 300, 310, and 320 to give prediction results corresponding to the calculated characteristic amounts, and utilizes the prediction results obtained from the data computing devices 300, 310, and 320 for a service of the prediction model sharing system.

[1.2.1 Sensing Unit]

The sensing unit 101 includes one or more measuring devices, which are sensors for sensing the information on the user.

The information to be sensed may be, for example, vital data such as blood pressure, body temperature, and heart rate of the user, or image information such as a face image, echo information, and CT scan information obtained by capturing or measuring the body of the user.

The information to be sensed may be location information obtained by a global positioning system (GPS), log information that indicates the user's operation history of a moving body such as an electric machine or a vehicle, or the user's purchase history information on products and the like, for example.

The log information is various kinds of information that is obtained or measured in relation with operations of a steering, an accelerator, a brake, a transmission, and so on of a vehicle, for example, and may be information in which an amount of displacement, a speed, an acceleration rate, and the like are in association with clock time of the operations, for example.

The information on the user to be sensed may be privacy data, which is a personal matter that the user does not want others to know, for example.

The prediction model sharing system is a prediction model sharing system for executing the prediction processing of the Binarized Neural Networks while concealing the privacy data and is a concealment prediction system for calculating prediction results in the concealed state. The information on the user sensed by the sensing unit 101 is described herein as the privacy data.

[1.2.2 Characteristic Amount Calculating Unit]

The characteristic amount calculating unit 102 calculates characteristic amounts based on the privacy data of the user obtained by the sensing unit 101. The characteristic amounts calculated by the characteristic amount calculating unit 102 can be represented by vectors including multiple components.

Each characteristic amount includes, for example, a component indicating an index related to at least one of shape, size, weight, condition, and motion of a part of or entire body of the user.

The body part of the user as a target of the characteristic amount may be any part such as, for example, eyes, nose, ears, legs, organs, and vessels.

Condition of a part of or entire body of the user may be, for example, health condition such as, for example, condition, a water amount, blood pressure, oxygen saturation, and so on corresponding to various examination items used for a health check.

Motion of a part of or entire body of the user may be, for example, body motion that specifically is the number of times of roll-over per unit time, and small vibrations such as heart rate, respiratory rate, and inspiratory-to-expiratory ratio, for example.

The characteristic amounts are, for example, a main component of characteristic parameters of the face image of the user. The characteristic amounts may be, for example, information such as a position, area, and width of any region. Provided that the history information indicating any of elements measured for a user by the sensing unit 101 is processed to obtain a polynomial, for example, representing a tendency of the element along a time axis, the characteristic amounts may be information represented by a vector including as components the coefficients of the terms of the polynomial.

The characteristic amounts extracted from the information obtained by the sensing unit 101 can also be the privacy data. FIG. 9 is a diagram that illustrates an example of the characteristic amounts in this embodiment.

[1.2.3 Characteristic Amount Sharing Unit]

The characteristic amount sharing unit 103 shares the characteristic amounts calculated by the characteristic amount calculating unit 102 by a method determined in advance and conceals the characteristic amounts. The characteristic amount sharing unit 103 creates the shared characteristic amounts by sharing the characteristic amounts by a method that allows the data computing devices 300, 310, and 320 to execute the prediction processing using the characteristic amount in the shared state, which is, for example, a Shamir's (2, 3) threshold secret sharing scheme disclosed in Adi Shamir, "How to share a secret," (http://dl.acm.org/citation.cfm?id=359176).

The secret sharing method is a technique of generating multiple pieces of sharing information from secret information. The sharing information is created so as to allow secret information to be restored from a combination determined in advance but not from another combination. The determined combination may have various structures called access structures. As a typical one of the various access structures, a threshold access structure is described herein. The threshold access structure is represented by two parameters, which are the number of pieces of generated sharing information n and a threshold k. That is, the secret information can be restored from k or more pieces of the sharing information but cannot be stored from less than k of the sharing information. One of the secret sharing methods having the threshold access structure is, for example, the above-mentioned Shamir's (2, 3) threshold secret sharing scheme including sharing processing for generating three pieces of the sharing information with the secret information as inputs and restoration processing for restoring the secret information from two or more pieces of the sharing information.

The secret sharing method is not limited to the method disclosed in Adi Shamir, and it is possible to use methods respectively disclosed in Ronald Cramer and two others, "Share Conversion, Pseudorandom Secret-Sharing and Applications to Secure Computation," (https://rd.springer.com/chapter/10.1007/978-3-540-30576-7_19) and Toshinori Araki and four others, "High-Throughput Semi-Honest Secure Three-Party Computation with an Honest Majority," (https://eprint.iacr.org/2016/768.pdf). A modulus p is determined by the system in advance and retained by the characteristic amount sharing unit 103. FIG. 10 is a diagram that illustrates an example of the shared characteristic amounts in this embodiment.

[1.2.4 Decoding Unit]

The decoding unit 104 receives from the data computing devices 300, 310, and 320 the prediction results corresponding to the shared characteristic amounts transmitted to the data computing devices 300, 310, and 320 by the user terminal device 100 and decodes them, respectively. These prediction results are results obtained by using the characteristic amounts and the prediction model in the shared state, which are shared by the secret sharing method, and are encrypted prediction results. In order to decode these prediction results, it is possible to use any one of the methods disclosed in Adi Shamir, Ronald Cramer et al., and Toshinori Araki et al., for example.

[1.2.5 Prediction Result Utilizing Unit]

The prediction result utilizing unit 105 utilizes the prediction results decoded by the decoding unit 104. Utilizing the prediction results is, for example, presenting the prediction results to the user, that is, presentation of the prediction results. The presentation of the prediction results may use an image or a voice, for example. When the presentation of the prediction results uses an image, the presentation image is, for example, displayed in a form of a graph or statistical information based on the prediction results. When the presentation of the prediction results uses a voice, the presentation voice is, for example, outputted based on the prediction results. The presentation of the prediction results may use a combination of the image and the voice. In this case, the user terminal device 100 is implemented while including a display for displaying the image, a voice output device such as a speaker for outputting the voice, and another user interface to present the prediction results.

Based on the prediction results, the prediction result utilizing unit 105 may further perform predetermined computing or information searching to present to the user a proposal of a health check at a hospital, advice on improving a life habit, or menu recommendation.

[1.2.6 Communicating Unit]

The communicating unit 106 communicates with the multiple data computing devices 300, 310, and 320. The communicating unit 106 transmits the shared characteristic amounts created by the characteristic amount sharing unit 103 to the data computing devices 300, 310, and 320, respectively. When receiving these shared characteristic amounts, the multiple data computing devices 300, 310, and 320 are triggered to execute the prediction processing using these shared characteristic amounts in the concealed state. This is described in detail in a following section of the data computing device. The communicating unit 106 receives the prediction results respectively calculated by the data computing devices 300, 310, and 320 and transmits them to the decoding unit 104. These prediction results are the above-described encrypted prediction results.

[1.3 Data Providing Device]

Next, descriptions of the data providing device 200 are provided. As illustrated in FIG. 1, the data providing device 200 is a device for providing data required by the company or the organization for the prediction processing to the data computing devices 300, 310, and 320 while concealing that data.

Figure 3:
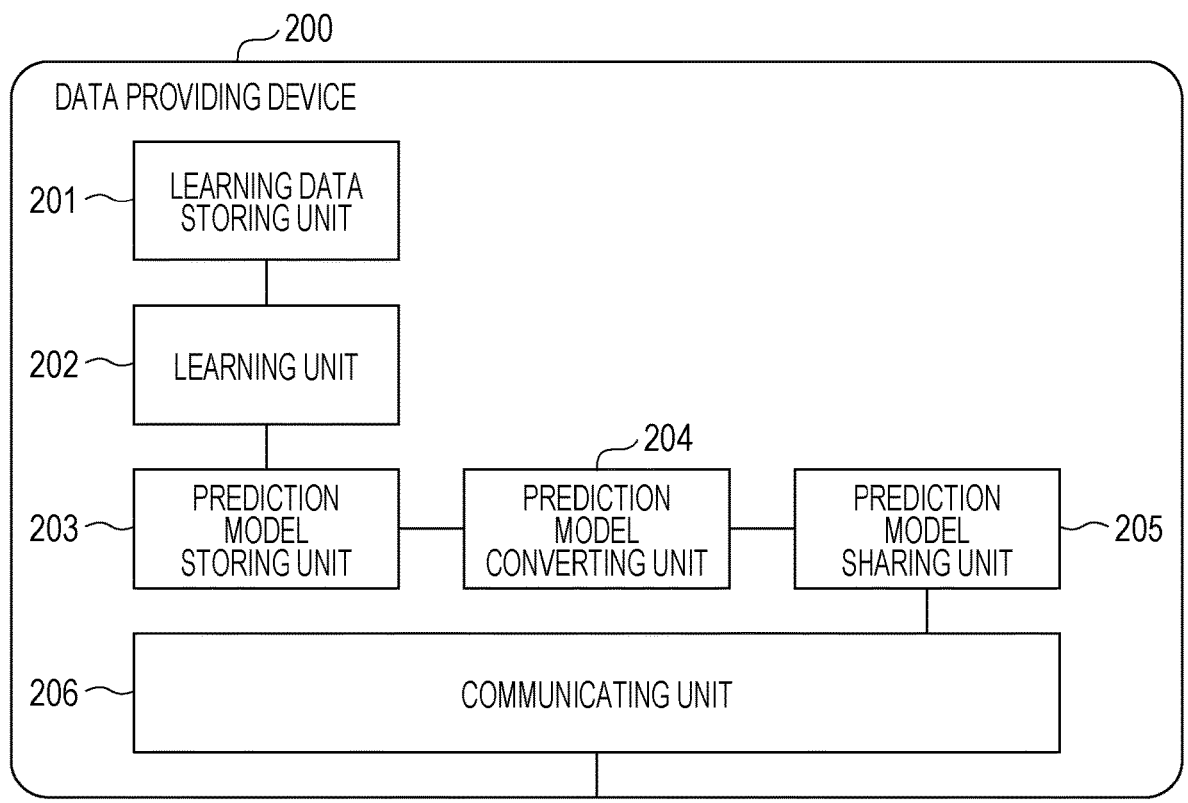
FIG. 3 is a diagram that illustrates an example of a configuration of a data providing device in the embodiment.

FIG. 3 is a diagram that illustrates an example of a configuration of the data providing device 200 in this embodiment. The data providing device 200 is configured to include a learning data storing unit (or data storage) 201, a learning unit (or learner) 202, a prediction model converting unit (or converter) 204, a prediction model sharing unit (or model sharer) 205, a communicating unit (or communicator) 206, and a prediction model storing unit (or model storage) 203.

The data providing device 200 creates prediction models by learning processing of the Binarized Neural Networks based on data in which biological information such as blood pressure, heart rate, CT scan information, and so on that the company or the organization holds and symptoms corresponding to the biological information are associated with each other. The data providing device 200 shares the created prediction models by the secret sharing method and transmits them in the concealed state to the multiple data computing devices 300, 310, and 320.

[1.3.1 Learning Data Storing Unit]

The learning data storing unit 201 stores learning data for creating the prediction models required for executing the prediction processing while concealing the inputs. The learning data is a pair of data having the same property as the characteristic amounts calculated by the characteristic amount calculating unit 102 of the user terminal device 100 and correct data corresponding to that data having the same property as the characteristic amounts. In this embodiment, the learning data is, for example, a pair of characteristic amounts calculated based on the vital data of multiple patients and disease names of the patients as the correct data corresponding to those characteristic amounts.

[1.3.2 Learning Unit]

The learning unit 202 executes the learning processing on the learning data stored in the learning data storing unit 201 by the method determined in advance and creates the prediction models. For example, the learning processing uses a method disclosed in Matthieu Courbariaux and four others, "Binarized Neural Networks: Training Deep Neural Networks with Weights and Activations Constrained to +1 or −1," (https://arxiv.org/abs/1602.02830). FIG. 12 is a diagram that illustrates an example of the prediction model in this embodiment.

[1.3.3 Prediction Model Storing Unit]

The prediction model storing unit 203 stores the prediction models created by the learning unit 202.

[1.3.4 Prediction Model Converting Unit]

The prediction model converting unit 204 executes conversion processing on the prediction models stored in the prediction model storing unit 203.

FIG. 11 is a diagram that illustrates an example of uniformization processing in this embodiment. (Equation A) in FIG. 11 indicates an example of uniformization processing of the prediction processing of the Binarized Neural Networks. $\gamma$, $\sigma$, $\varepsilon$, $\beta$, and $\mu$ in (Equation A) indicate learned parameters included in each prediction model, x indicates an input of the uniformization processing, and y indicates an output of the uniformization processing. In (Equation B) and (Equation C) in FIG. 11 indicating a part of (Equation A) can be calculated before the prediction processing since the above-mentioned five learned parameters are fixed values. Thus, the prediction model converting unit 204 calculates these (Equation B) and (Equation C) in advance before the uniformization processing and sets the result as a new prediction model. Hereinafter, calculation of (Equation B) and (Equation C) in FIG. 11 in advance is also referred to as previous calculation.

In this way, amounts of calculation and communications can be reduced in the data computing devices 300, 310, and 320.

Since a decimal cannot be used when the prediction model sharing unit 205 shares the predict model by the secret sharing method, the prediction model converting unit 204 multiplies the created prediction model by a numerical value determined in advance and then rounds it off to an integer. For example, the prediction model converting unit 204 multiplies the created prediction model by 10 and then rounds it off to an integer (see FIGS. 13A and 13B).

Since a negative numerical value cannot be used when the prediction model sharing unit 205 shares the predict model by the secret sharing method, the prediction model converting unit 204 converts an element represented by a negative numerical value to a positive numerical value in the prediction model to create the converted prediction model. For example, when one element x is a negative numerical value, the prediction model converting unit 204 converts the element x to p+x by using the modulus p used for the sharing processing (see FIGS. 13B and 13C).

FIG. 13A is a diagram that illustrates an example of the prediction model after the previous calculation in this embodiment. FIG. 13A illustrates new parameters s and t that are calculated by substituting the five parameters $\gamma$, $\sigma$, $\epsilon$, $\beta$, and $\mu$ illustrated in FIG. 12 into (Equation B) and (Equation C) in FIG. 11. The parameters s and t include decimals. As described above, since a decimal cannot be used when sharing the prediction model, the decimals are rounded off to integers. In this case, the prediction model converting unit 204 multiplies each of the parameters s and t by 10 and then rounds them off to integers.

FIG. 13B is a diagram that illustrates an example of the prediction model after rounded to an integer in this embodiment. As illustrated in FIG. 13B, the parameters s and t rounded off to integers include negative numerical values. As described above, since a negative numerical value cannot be used when sharing the prediction model, the negative numerical values are converted to positive numerical values. Specifically, the prediction model converting unit 204 adds a random value p (above-mentioned modulus p) used in the secret sharing method to each negative numerical value and converts the negative numerical values to positive numerical values. For example, if p=65519, the negative numerical values in the above parameters are converted to extremely large positive values corresponding to the negative values.

FIG. 13C is a diagram that illustrates an example of the prediction model after converting a negative numerical value to a positive numerical value in this embodiment. As described above, each of the parameters s and t illustrated in FIG. 13C is converted to an extremely large positive numerical value corresponding to the negative numerical value in the prediction model rounded off to an integer by adding the modulus p to the negative numerical value. In FIG. 13C, p=65519.

[1.3.5 Prediction Model Sharing Unit]

The prediction model sharing unit 205 shares the converted prediction models created by the prediction model converting unit 204 by a method determined in advance and conceals it. The prediction model sharing unit 205 creates shared prediction models that can be subjected to the prediction processing while keeping the characteristic amounts in the encrypted state in the data computing devices 300, 310, and 320. For example, the prediction model sharing unit 205 performs the sharing by the Shamir's (2, 3) threshold secret sharing scheme described in Adi Shamir.

As described above, the secret sharing method is not limited to the method disclosed in Adi Shamir, and it is possible to use the methods respectively disclosed in Ronald Cramer et al. and Toshinori Araki et al. The modulus p used for the sharing processing is determined by the system in advance and retained by the prediction model sharing unit 205.

[1.3.6 Communicating Unit]

The communicating unit 206 communicates with the data computing devices 300, 310, and 320. The communicating unit 206 transmits the shared prediction models created by the prediction model sharing unit 205 to the multiple data computing devices 300, 310, and 320.

[1.4 Data Computing Device]

Next, descriptions of the data computing device are provided. As illustrated in FIG. 1, the data computing devices 300, 310, and 320 are, for example, cloud servers. The prediction model sharing system may include at least two or more of the data computing device 300. In this embodiment, the three data computing devices 300, 310, and 320 communicate with each other to calculate the prediction results while concealing the data and transmit the prediction results to the user terminal device 100, respectively. More specifically, each of the data computing devices 300, 310, and 320 inputs the shared characteristic amounts to the corresponding shared prediction model and execute the prediction processing with the shared prediction model. Hereinafter, the data computing devices 300, 310, and 320 in this embodiment are described in more detail.

Figure 4:
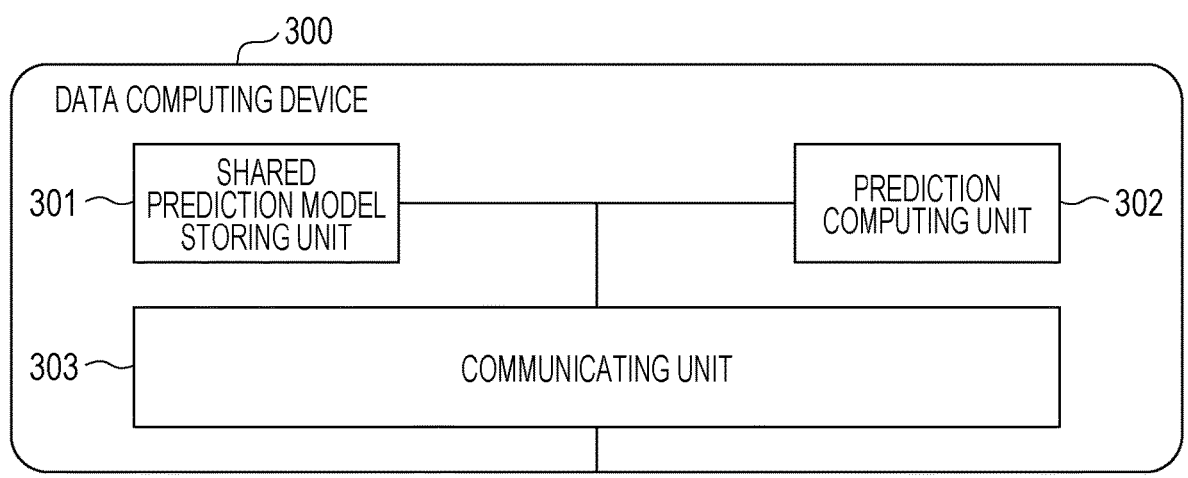
FIG. 4 is a diagram that illustrates an example of a configuration of a data computing device in the embodiment.

FIG. 4 is a diagram that illustrates an example of a configuration of the data computing device 300 in this embodiment. The data computing device 300 is configured to include a shared prediction model storing unit (or shared prediction model storage) 301, a prediction computing unit (or prediction computer) 302, and a communicating unit (or communicator) 303. The data computing device 300 uses the shared characteristic amounts received from the user terminal device 100 and the shared prediction model received from the data providing device 200 in the shared state to execute the prediction processing. The data computing devices 310 and 320 have the same structures as the data computing device 300.

[1.4.1 Shared Prediction Model Storing Unit]

The shared prediction model storing unit 301 stores the shared prediction model received from the data providing device 200.

[1.4.2 Prediction Computing Unit]

The prediction computing unit 302 uses the shared prediction model stored in the shared prediction model storing unit 301 and the shared characteristic amounts received from the user terminal device 100 to execute the prediction processing. The prediction computing unit 302 uses the shared prediction model and the shared characteristic amounts in the shared state to execute the prediction processing and obtains the shared prediction result.

Figure 14:
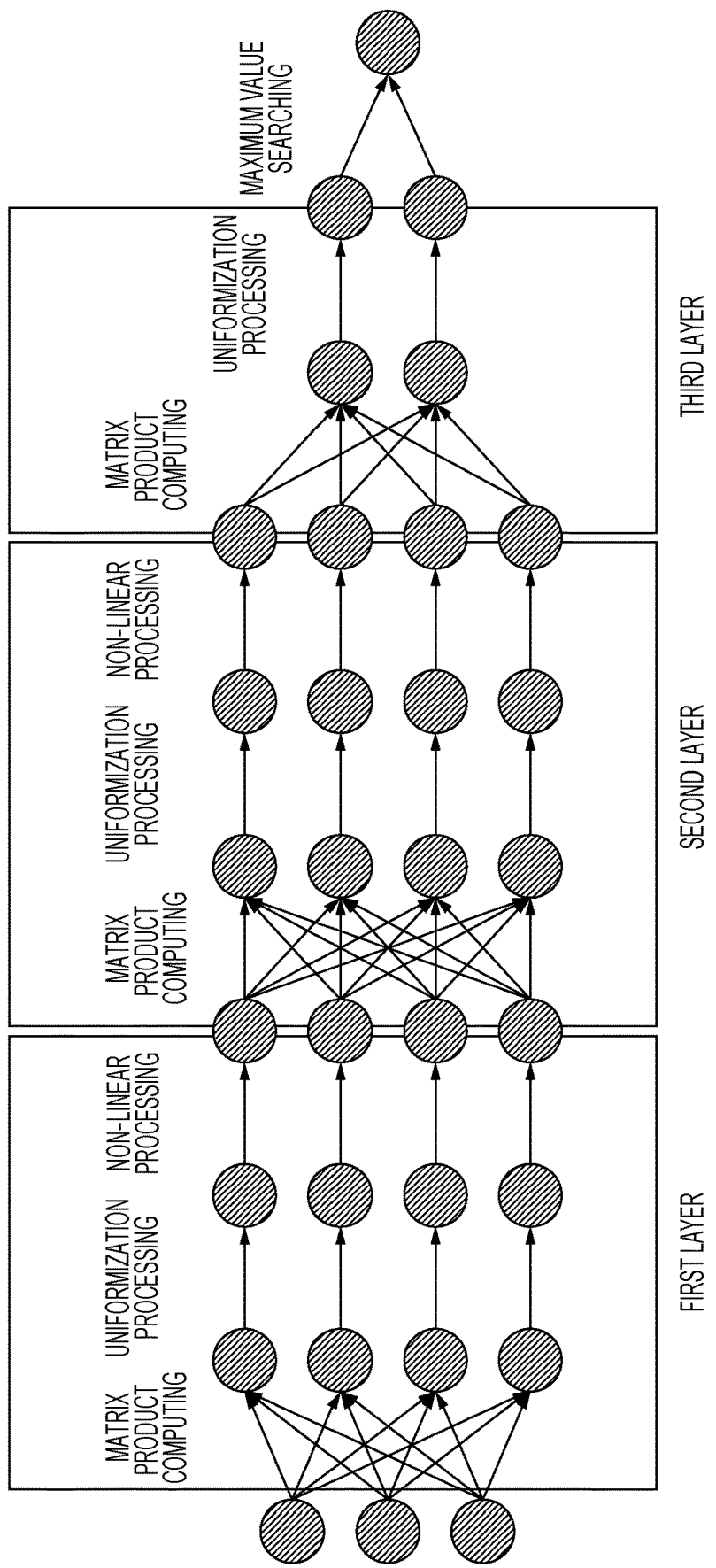
FIG. 14 is a schematic diagram that illustrates a flow of the prediction processing in the embodiment.

FIG. 14 is a schematic diagram that illustrates a flow of the prediction processing in this embodiment. The prediction processing is executed by four kinds of processing which are matrix product computing, uniformization processing of data distribution, non-linear processing, and maximum value searching. In the prediction processing, the matrix product computing, the uniformization processing of data distribution, and the non-linear processing iterate a predetermined number of times, and thereafter the prediction result is obtained by the maximum value searching.

First, descriptions of the matrix product computing are provided. The matrix product computing calculates a matrix product of the shared characteristic amounts as shared input vectors and shared weight matrices included in the shared prediction model. FIG. 15 is a diagram that illustrates an example of the weight matrices before conversion in this embodiment. As illustrated in FIG. 15, the prediction model is the Binarized Neural Network including two values of 1 and −1 as the multiple parameters. Although it is not illustrated, the shared prediction model in this embodiment is, for example, an encrypted prediction model, which is obtained by sharing by the secret sharing method the converted prediction model obtained by converting a negative numerical value to a positive numerical value in the multiple parameters included in the prediction model illustrated in FIG. 15. Meanwhile, the shared characteristic amounts are encrypted characteristic amounts, which are, likewise the prediction model, obtained by sharing by the secret sharing method the characteristic amounts calculated based on the data obtained by sensing. For example, as illustrated in FIG. 10, the shared characteristic amounts are three encrypted characteristic amounts obtained by sharing by the secret sharing method one characteristic amount (e.g., characteristic amount 1). Specifically, the characteristic amount 1 illustrated in FIG. 9 is 12, and when adding a random value (in this case, 26) used in the secret sharing method to this characteristic amount 1, a shared characteristic amount 38 of the characteristic amount 1, which is transmitted to the data computing device 300 illustrated in FIG. 10, is calculated. As described above, the number of times of adding the random value is increased in accordance with the number of the shared data pieces. Specifically, a second shared characteristic amount is obtained by adding a random value 26 two times. For example, the second shared characteristic amount is a shared characteristic amount 64 of the characteristic amount 1, which is transmitted to the data computing device 310 illustrated in FIG. 10.

Next, descriptions of the uniformization processing of the data distribution obtained by the matrix product computing are provided. FIG. 16 is a diagram that illustrates an example of an expression used in the uniformization processing of the data distribution in this embodiment. In FIG. 16, x is an input vector that is calculated by the above-mentioned matrix product computing. Vectors s and t are uniformization parameters included in the prediction model. FIG. 16 corresponds to the equation y=sx+t obtained from (Equation A), (Equation B), and (Equation C) in FIG. 11. In this case, y is an output vector that is calculated by the uniformization processing. The uniformization processing is calculated by adding and multiplying the input vector and the uniformization parameters. Performing the uniformization processing can reduce the number of times of the iteration of the matrix product computing, the uniformization processing, and the non-linear processing. In this embodiment, the vectors s and t illustrated in FIG. 13C are used as the uniformization parameters.

Next, descriptions of the non-linear processing are provided. The non-linear processing is processing of non-linear conversion on an element of each shared input vector that is the vector calculated by the uniformization processing (e.g., the above-mentioned y). For example, when an input to the non-linear processing is 0 or a positive numerical value, the non-linear processing converts the element to 1, and when the input to the non-linear processing is a negative numerical value, the non-linear processing converts the element to a positive numerical value corresponding to −1.

In the prediction processing, the maximum value searching is executed after iterating execution of the above-mentioned matrix product computing, the uniformization processing of the data distribution, and the non-linear processing a predetermined number of times.

Next, descriptions of the maximum value searching are provided. The maximum value searching searches for an element of the maximum value among all the elements of the shared input vectors. For example, the maximum value searching is implemented by comparing magnitude relationships between all the elements of the input vector for the maximum value searching and calculating a logical conjunction of the comparison result. More specifically, in the maximum value searching, magnitude relationships between every element and all the other elements are individually compared. The comparison result is represented by two values that are 0 and 1. For example, when a value of one element is equal to or greater than a value of the other element, the comparison result is represented by 1, and when a value of one element is smaller than a value of the other element, the comparison result is represented by 0. For all the elements, the comparison results of the magnitude relationships with the other elements are stored in a comparison table. In this case, for the elements of the maximum value among all the elements, all the comparison results of the magnitude relationship with the other elements become 1. Thus, when calculating the logical conjunction of the comparison result, only the logical conjunctions of the elements of the maximum value become 1 and of all the other elements become 0. The elements of the maximum value can be extracted with this property.

As described above, in this embodiment, the four kinds of processing including the matrix product computing, the uniformization processing of the data distribution, the non-linear processing, and the maximum value searching can be composed of only adding, multiplying, comparing the magnitude relationship, and calculating the logical conjunction of the inputs for each processing. In Takashi Nishide and one other, "Multiparty Computation for Interval, Equality, and Comparison Without Bit-Decomposition Protocol," "Public Key Cryptography—PKC 2007," Springer Berlin Heidelberg, (https://rd.springer.com/chapter/10.1007/978-3-540-71677-8_23), without decoding the two shared values, it is possible to perform adding, multiplying, comparing of the magnitude relationship, and calculating the logical conjunction of those values. Thus, using a formula disclosed in Takashi Nishide et al., for the prediction processing, it is possible to execute the prediction processing while concealing the inputs without decoding the shared prediction model and the shared characteristic amounts.

[1.4.3 Communicating Unit]

The communicating unit 303 of the data computing device 300 communicates with the user terminal device 100, the data providing device 200, and other data computing devices 310 and 320. The communicating unit 303 receives the shared prediction model from the data providing device 200 and stores the received shared prediction model in the shared prediction model storing unit. The communicating unit 303 receives the shared characteristic amounts from the user terminal device 100 and transmits the received shared characteristic amounts to the prediction computing unit 302. The communicating unit 303 transmits the shared prediction result calculated by the prediction computing unit 302 to the user terminal device 100.

As described above, the data computing device 300 executes the prediction processing without decoding the shared prediction model and the shared characteristic amounts in the shared or concealed state. Thus, the communicating unit 303 transmits data that is obtained by executing the processing on the shared prediction model and the shared characteristic amounts to the other data computing devices 310 and 320.

[2. Operation of Prediction Model Sharing System (Prediction Model Sharing Method)]

Descriptions of an example of operations of the prediction model sharing system are provided. The operations of the prediction model sharing system includes two phases: a learning phase in which the data providing device 200 learns and shares the prediction models; and a prediction phase in which the multiple data computing devices 300, 310, and 320 use the shared prediction models to predict the shared characteristic amounts.

[2.1 Learning Phase]

Figure 5:
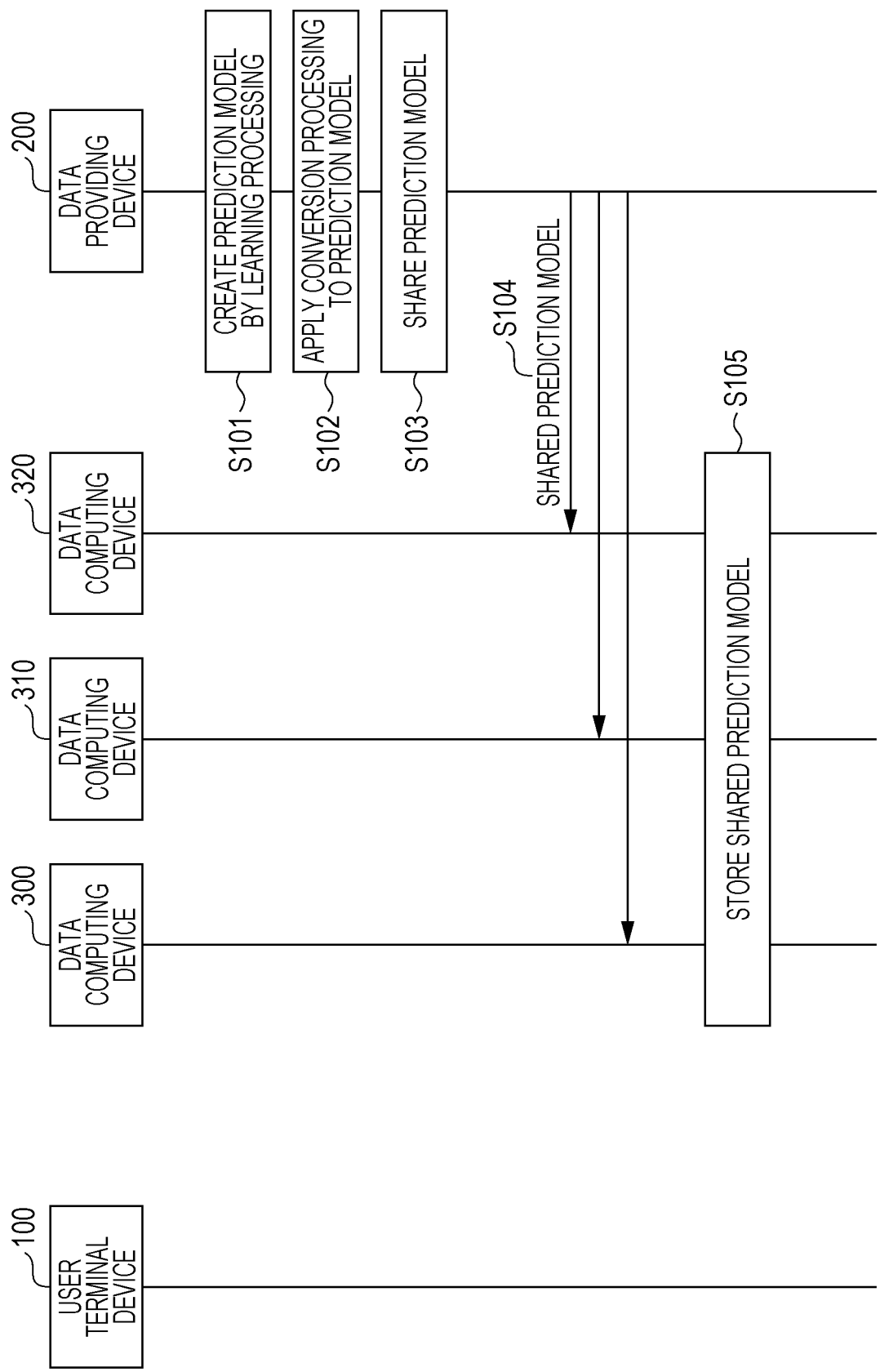
FIG. 5 is a sequence diagram that illustrates operations of a learning phase of the prediction model sharing system in the embodiment.

First, descriptions of operations of the learning phase of the prediction model sharing system are provided. FIG. 5 is a sequence diagram that illustrates the operations of the learning phase of the prediction model sharing system according to this embodiment.

In a learning step S101, the data providing device 200 refers to the learning data stored in the learning data storing unit 201 and causes the learning unit 202 to execute the learning processing of the prediction models, which are the Binarized Neural Networks.

The prediction models for executing the prediction processing is thus created. The created prediction models are stored in the prediction model storing unit 203.

Next, in a prediction model converting step S102, the data providing device 200 causes the prediction model converting unit 204 to apply the conversion processing to the created prediction models. Specifically, in the prediction model converting step S102, the data providing device 200 converts the prediction models as the neural networks by converting a negative numerical value to a positive numerical value in the multiple parameters included in that prediction models.

More specifically, in the prediction model converting step S102, a decimal value is converted to an integer value in the multiple parameters included in the prediction models, and thereafter a negative numerical value is converted to a positive numerical value in the multiple parameters.

In this way, since the prediction models including a negative numerical value can be represented by only a positive numerical value, it is possible to make correct calculation even after sharing the prediction models by the secret sharing method.

Next, in a prediction model sharing step S103, the data providing device 200 shares the prediction models converted in the prediction model converting step S102 by the secret sharing method. The shared prediction models are thus obtained.

Next, in step S104, the data providing device 200 transmits the shared prediction models obtained in the prediction model sharing step S103 to the multiple data computing devices 300, 310, and 320.

Next, in step S105, the data computing devices 300, 310, and 320 store the shared prediction models received from the data providing device 200 into the shared prediction model storing unit 301.

As described above, in the learning phase, the data providing device 200 creates the prediction models for executing the prediction processing and creates the shared prediction models by sharing the created prediction models by the secret sharing method. This makes it possible to transmit the prediction models in the concealed state to the multiple data computing devices 300, 310, and 320.

[2.2 Prediction Phase]

Figure 6:
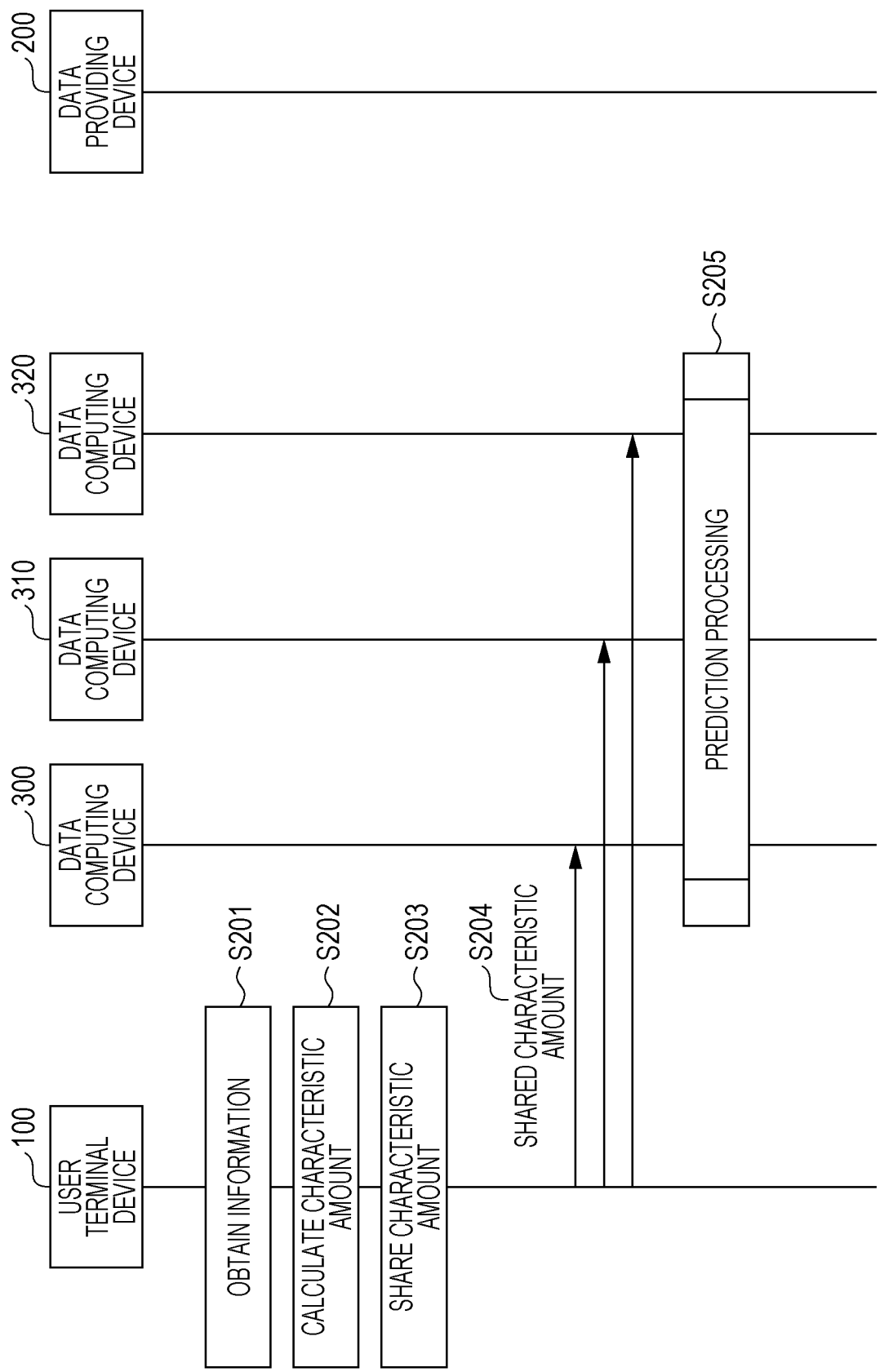
FIG. 6 is a sequence diagram that illustrates operations of a prediction phase of the prediction model sharing system in the embodiment.
Figure 7:
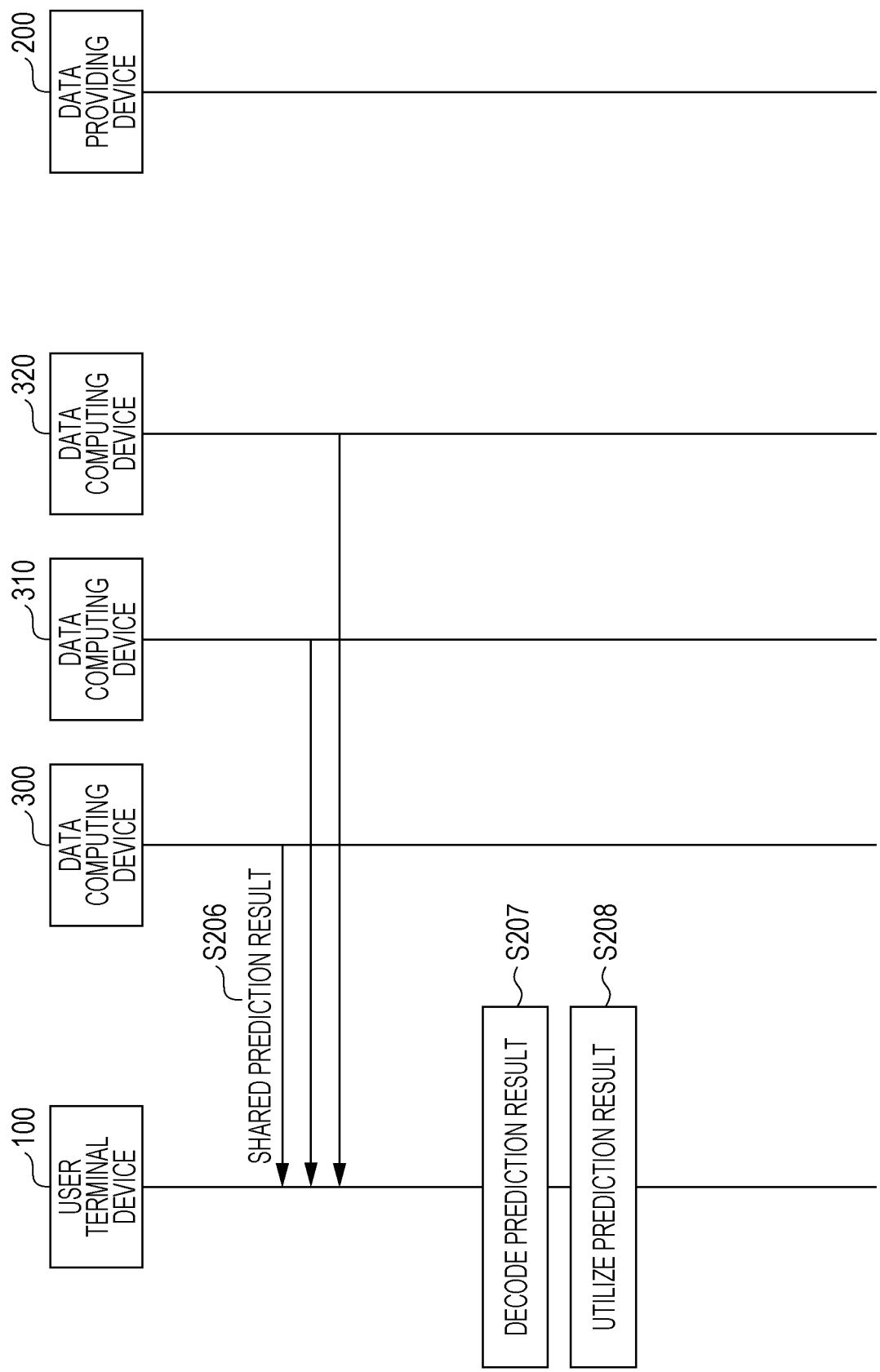
FIG. 7 is a sequence diagram that illustrates the operations of the prediction phase of the prediction model sharing system in the embodiment.

Next, descriptions of the prediction phase of the prediction model sharing system are provided. FIGS. 6 and 7 are sequence diagrams that illustrate an example of the operations of the user terminal device 100 in the prediction phase of the prediction model sharing system according to this embodiment.

First, in a step S201, the user terminal device 100 obtains information with the sensing unit 101. At this point, the information obtained by the sensing is the privacy data of the user. The information obtained by the sensing unit 101 is transmitted to the characteristic amount calculating unit 102.

Next, in a characteristic amount calculating step S202, the user terminal device 100 causes the characteristic amount calculating unit 102 to calculate the characteristic amounts based on the information received from the sensing unit 101. The characteristic amounts are values indicating characteristics of the information received from the sensing unit 101. Referring back to FIG. 9, FIG. 9 illustrates the characteristic amounts 1, 2, and 3 as an example of the above-mentioned characteristic amounts.

Next, in a characteristic amount sharing step S203, the user terminal device 100 shares the characteristic amount calculated in the characteristic amount calculating step S202 by the secret sharing method. The shared characteristic amounts are thus obtained. Now, referring back to FIG. 10, descriptions of a shared characteristic amount calculating method are provided. For example, when the information on the user sensed by the sensing unit 101 is the characteristic amount 1, the characteristic amount 1 is shared into a number (in this case, three) according to the number of the data computing devices. A random value used in the secret sharing method (in this case, 26) is added to the characteristic amount 1 to calculate the shared characteristic amounts to be transmitted to the data computing device 300. Then, 26 is further added to this shared characteristic amount to calculate the shared characteristic amounts to be transmitted to the data computing device 310. Additionally, 26 is further added to this shared characteristic amount to calculate the shared characteristic amount to be transmitted to the data computing device 320.

Next, in a step S204, the user terminal device 100 transmits the shared characteristic amounts to the multiple data computing devices 300, 310, and 320. Specifically, as illustrated in FIG. 10, the user terminal device 100 transmits the shared characteristic amounts, which are shared characteristic amounts 1, 2, and 3, to the multiple data computing devices 300, 310, and 320, respectively.

Once respectively receiving the shared characteristic amounts from the user terminal device 100, the multiple data computing devices 300, 310, and 320 read the shared prediction models stored in the shared prediction model storing unit (the shared prediction model storing unit 301 in the data computing device 300) and starts a prediction processing step S205.

In the prediction processing step, the multiple data computing devices 300, 310, and 320 use the shared characteristic amounts and the shared prediction models in the shared state and execute the prediction processing of the Binarized Neural Networks. Details of the prediction processing step S205 is described later.

In this way, the multiple data computing devices 300, 310, and 320 respectively obtain the shared prediction results as a result of the prediction processing. Note that, when calculation of the prediction processing is executed with the formula of Takashi Nishide et al., the multiple data computing devices 300, 310, and 320 are required for executing the prediction processing to communicate with each other the shared information that each of the multiple data computing devices 300, 310, and 320 has as well as the data obtained by executing the prediction processing on the shared information.

Next, in a step S206, the multiple data computing devices 300, 310, and 320 transmit the shared prediction results to the user terminal device 100, respectively.

Next, in a step S207, the user terminal device 100 receives the shared prediction results transmitted from the multiple data computing devices 300, 310, and 320 and decodes the received shared prediction results to obtain the prediction results.

Finally, in a step S208, the user terminal device 100 causes the prediction result utilizing unit 105 to utilize the obtained prediction results.

As described above, in the prediction phase, the data providing device 200 creates the prediction models for executing the prediction processing and creates the shared prediction models by sharing the created prediction models by the secret sharing method. This makes it possible to transmit the prediction models in the concealed state to the multiple data computing devices 300, 310, and 320.

[2.3 Prediction Processing Step S205]

When receiving the shared characteristic amounts from the user terminal device 100, the multiple data computing devices 300, 310, and 320 are triggered to start the prediction processing step S205. In the prediction processing step S205, the multiple data computing devices 300, 310, and 320 use the shared characteristic amounts and the shared prediction models in the shared state and execute the prediction processing of the Binarized Neural Networks.

Figure 8:
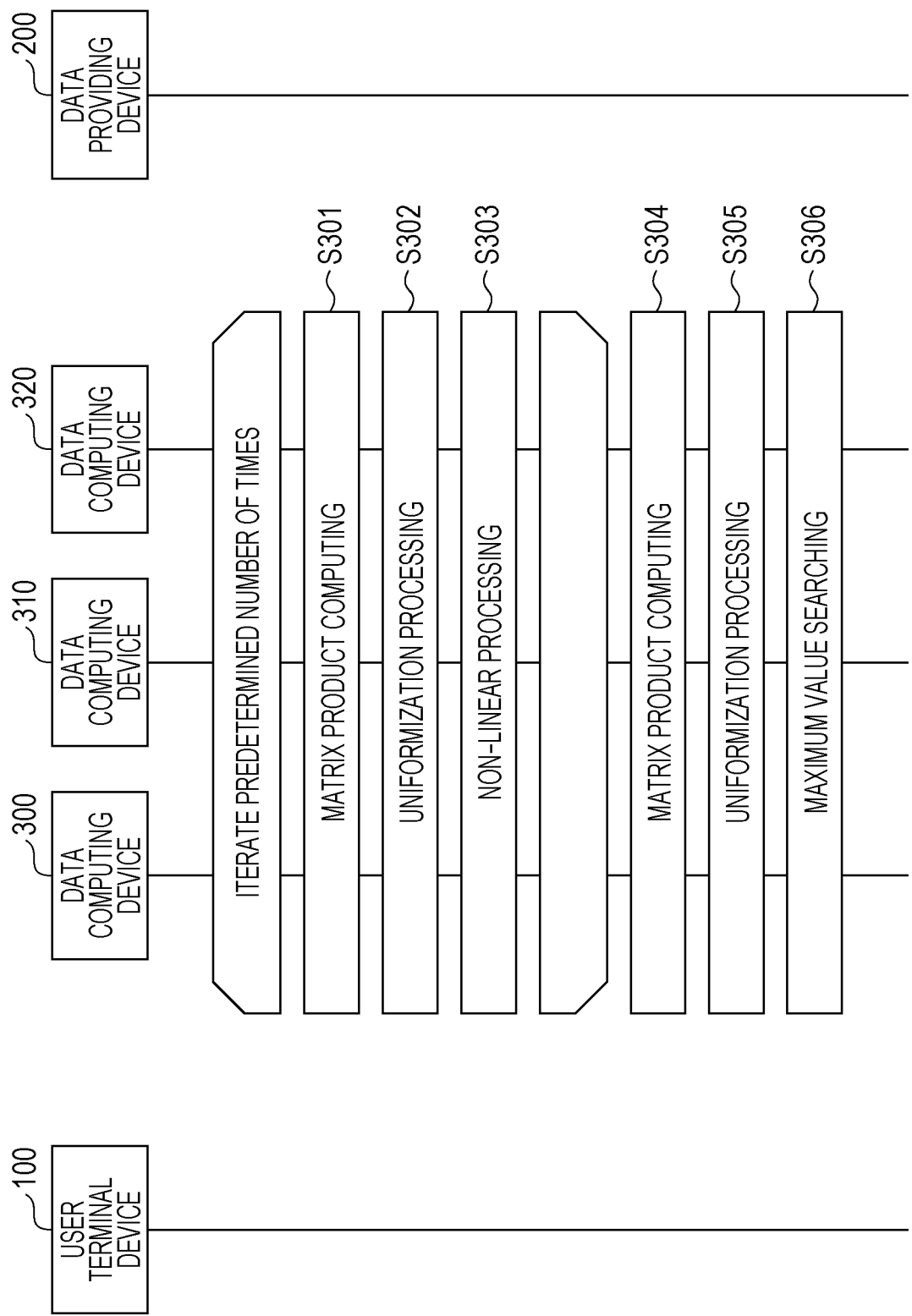
FIG. 8 is a sequence diagram that illustrates operations of prediction processing in the embodiment.

Hereinafter, more detailed descriptions of the prediction processing step S205 of the prediction model sharing system are provided. FIG. 8 is a sequence diagram that illustrates an example of the operations of the multiple data computing devices 300, 310, and 320 in the prediction phase of the prediction model sharing system according to this embodiment.

First, in a matrix product computing step S301, once receiving the shared input vectors as the shared characteristic amounts (see FIG. 10), the multiple data computing devices 300, 310, and 320 calculate a matrix product of the shared weight matrices as the shared prediction models (see FIG. 15) and obtain first shared vectors as outputs. To describe more specifically with taking an operation of the data computing device 300 as an example, once receiving the shared characteristic amount from the user terminal device 100, the data computing device 300 reads the shared prediction model stored in the shared prediction model storing unit 301. Then, the data computing device 300 calculates a matrix product of the shared characteristic amounts and the shared prediction model and obtains the first shared vector. The shared prediction model (in this case, shared weight matrix) is obtained by sharing the converted prediction model, which has been converted to make all the elements be positive numerical values, by the secret sharing method. More specifically, in the prediction model as the binarized neural network (in this case, weight matrix) illustrated in FIG. 15, −1 in the multiple parameters (that is, elements) of that prediction model is converted to a positive numerical value corresponding to −1. Since all the elements of the prediction model are represented by positive numerical values, the prediction model sharing system can share that prediction model by the secret sharing method.

Next, in a uniformization processing step S302, the multiple data computing devices 300, 310, and 320 use the first shared vectors obtained as outputs in the matrix product computing step S301 and the uniformization parameters (see FIG. 16) to calculate a product and a sum of every element included in the first shared vectors and obtain second shared vectors that are second shared characteristic amounts as outputs. Specifically, as illustrated in FIG. 16, the second shared vectors are obtained by substituting each of elements x1 to x4 into the uniformization processing formula y=sx+t derived from (Equation A) to (Equation C) in FIG. 11.

Next, in a non-linear processing step S303, the non-linear processing is executed using the second shared vectors, which have been obtained as outputs in the uniformization processing step S302, as input vectors for the non-linear processing. More specifically, in the non-linear processing step S303, when one element of the input vectors is 0 or a positive numerical value, the element is converted to 1, whereas when one element of the input vector is a negative numerical value, the element is converted to a positive numerical value corresponding to −1. In this way, third shared vectors that are third shared characteristic amounts are obtained as outputs in the non-linear processing step S303.

Next, the multiple data computing devices 300, 310, and 320 use the third shared vectors obtained as outputs in the non-linear processing step S303 and the shared prediction models to execute the matrix product computing step S301. Thereafter, the multiple data computing devices 300, 310, and 320 execute the uniformization processing step S302 with fourth shared vectors as inputs, which have been obtained in the matrix product computing step S301, and then execute the non-linear processing step S303 with fifth shared vectors as inputs, which have been obtained in the uniformization processing step S302. Sixth shared vectors are thus obtained.

In this way, a series of steps including the above-described matrix product computing step S301, the uniformization processing step S302, and the non-linear processing step S303 is iterated a predetermined number of times. Referring back to FIG. 14, in this embodiment, this series of steps (i.e., layer) iterates two times, for example. The sixth shared vectors are thus obtained. Then, in the matrix product computing processing S304, the multiple data computing devices 300, 310, and 320 calculate matrix products of the sixth shared vectors obtained as outputs by iterating that series of steps S301 to S303 a predetermined number of times (in this case, two times) and the weight matrices. Seventh shared vectors are thus obtained. Thereafter, in the uniformization processing step S305, the uniformization processing is executed on the seventh shared vectors obtained in the matrix product computing step S304. Eighth shared vectors are thus obtained. At last, in a maximum value searching step S306, elements of the maximum value among the eighth shared vectors obtained in the uniformization processing step S305 are searched for. The shared prediction results are thus obtained.

As described above, in the prediction model sharing method according to this embodiment, it is possible to share the prediction models by the secret sharing method by converting a negative numerical value to a positive numerical value in the multiple parameters of the prediction models. In this way, it is possible to execute the prediction processing using the shared characteristic amounts and the shared prediction models in the shared or concealed state. Thus, even when a third person obtains data related to the prediction processing during the prediction processing, it is hard to decode the data to the original data. Hence, application the prediction model sharing method according to this embodiment makes it possible to protect the highly confidential information such as the privacy data of the user and unique know-how of the company from the third person. Additionally, for example, calculation of a part of the multiple parameters of the prediction models such as the uniformization parameters makes it possible to speed up the prediction processing.

(Other Embodiments)

The prediction model sharing system and the prediction model sharing method according to the present disclosure are described based on the embodiment; however, the present disclosure is not limited to the above embodiment. Without departing from the gist of the present disclosure, an embodiment with various modifications that the skilled in the art conceives of and a different form composed of a combination of parts of the constituents of the embodiment are also included in a range of the present disclosure. For example, the present disclosure includes following cases.

(1) In the above embodiment, an example is indicated where the data providing device 200 causes the prediction model converting unit 204 to convert a negative numerical value to a positive numerical value in the multiple parameters (hereinafter also referred to as elements) included in the prediction models; however, it is not limited thereto. The prediction model converting unit 204 may execute following conversion processing on the prediction models. Assuming that one element x (in this case, x is an integer) is x=ab (note that a is a sign part indicating a sign of x and b is a numerical value part indicating an absolute value of x). When the element x is 0 or a positive numerical value, 0 is substituted into the sign part a, and when the element x is a negative numerical value, 1 is substituted into the sign part a. The absolute value of x is substituted into the numerical value part b. In this way, the element x is converted to a pair of a and b (a, b). Application of this conversion processing to all the elements included in the prediction models makes it possible to convert a negative numerical value included in the prediction models to a positive numerical value. Thus, all the elements included in the prediction models after the conversion processing are represented by only positive numerical values (in this case, positive integers). Hence, the prediction model sharing unit 205 can share the prediction models after the conversion processing by the secret sharing method.

(2) In the above embodiment, an example is indicated where the data providing device 200 causes the prediction model converting unit 204 to execute the conversion processing of the parameters s and the parameters t included in the equations of the uniformization processing when calculating the parameters s and the parameters t in advance using the learned parameters; however, it is not limited thereto. The prediction model converting unit 204 may execute following conversion processing on the equations of the uniformization processing. If the prediction model converting unit 204 calculates (Equation B) and (Equation C) in FIG. 11 in advance, that is, before the uniformization processing, the parameters s and the parameters t are determined. Thus, (Equation A) in FIG. 11 is represented as y=sx+t. Hence, the prediction computing unit 302 can execute the uniformization processing on the input x with the uniformization processing equation y=sx+t. After the uniformization processing, the non-linear processing is executed. In the non-linear processing, the magnitude relationship between the output y as a calculation result of sx+t and 0 is compared. For example, when comparing the magnitude relationship between one numerical value and 0, the comparison result of the magnitude relationship between that numerical value and 0 will not change by dividing that numerical value by any positive numerical value. Thus, when comparing the magnitude relationship between the output y of the uniformization processing and 0, a numerical value obtained by dividing y by a predetermined positive numerical value can be used instead of y for this comparison. For example, assuming that s in the equations of the above uniformization processing is s=cd (note that c represents a sign of x and d represents an absolute value of s) and if the output y of the uniformization processing is divided by the absolute value d of s, y/d=cx+t/d is obtained. The data providing device 200 may cause the prediction model converting unit 204 to calculate t/d in advance. In this way, the prediction computing unit 302 can execute the uniformization processing on the input x with the equation y/d=cx+t/d, which is an equation of the uniformization processing in which y is divided by a predetermined positive numerical value. As described above, with the equation of the uniformization processing y/d=cx+t/d, the prediction computing unit 302 can reduce the amount of calculation more than a case of using the equation of the uniformization processing y=sx+t from the above-described embodiment.

(3) In the above embodiment, the processing of an example of the non-linear processing by the prediction computing unit 302 is that when the input to the non-linear processing is 0 or a positive numerical value, the input is converted to 1, whereas when the input to the non-linear processing is a negative numerical value, the input is converted to a positive numerical value corresponding to −1; however, it is not limited thereto. For example, in the non-linear processing, conversion processing that makes numerical values after the non-linear processing become three integers represented by 0 or greater numerical values may be applied, that is, processing in which when the input is 0, the element is converted to 0, when the input is greater than 0, the element is converted to 1, and when the input is smaller than 0, the element is converted to a positive numerical value corresponding to −1.

(4) In the above embodiment, an example of the maximum value searching processing by the prediction computing unit 302 is a processing method of comparing the magnitude relationships between every element and all the other elements and determining an element that a logical conjunction of the comparison result is 1 as an element of the maximum value; however, it is not limited thereto. For example, in the maximum value searching processing, the element of the maximum value (hereinafter, maximum value element) may be obtained by following processing. Assuming that a first element (or element A) among the multiple elements of the input vectors for the maximum value searching processing is a temporal maximum value element, and sequentially the magnitude relationships between the element A and the rest of the elements are compared. When an element (or element B) greater than the element A as the temporal maximum value element is found, making the element B as a new temporal maximum value element, and sequentially the magnitude relationships between the element B and the rest of the elements are compared. If the element B is the temporal maximum value element after all the elements are compared, the numerical value and the number of the element B are used as outputs for the maximum value searching processing.

(5) In the maximum value searching processing by the prediction computing unit 302, the maximum value element may be obtained by following processing. For example, the magnitude relationships of every element of the input vectors for the maximum value searching with adjacent elements are compared, and then smaller elements are removed. The maximum value element can be obtained by iterating this processing and determining the last element as the maximum value element.

(6) In the above embodiment, an example of the processing by the user terminal device 100 using the prediction results is described; however, the user terminal device 100 may use following processing. After receiving and decoding the prediction results, the user may transmit information on whether the prediction results are right or wrong and utility of the prediction results to the data providing device 200.

(7) In the above embodiment, an example of the processing by the user terminal device 100 using the prediction results is described; however, the user terminal device 100 may use following processing. After receiving and decoding the prediction results from the multiple data computing devices 300, 310, and 320, the user terminal device 100 may transmit the information on whether the prediction results are right or wrong and utility of the prediction results to the data providing device 200 with information on the user that has been inputted to the prediction model sharing system (hereinafter, user information).

(8) In the above embodiment, an example of the processing executed by the data providing device 200 is described; however, the data providing device 200 may execute following processing. The data providing device 200 may execute learning of the prediction models again based on the pair of the user information and the information on the prediction results received from the user terminal device 100 or only the information on the prediction results. The data providing device 200 then shares prediction models newly created by the re-learning and transmits them as new shared prediction models to the multiple data computing devices 300, 310, and 320. The multiple data computing devices 300, 310, and 320 store the received new prediction models in the corresponding prediction model storing unit and update the prediction models, respectively.

(9) The devices in the above embodiment are specifically a computer system composed of a microprocessor, a read only memory (ROM), a random access memory (RAM), a hard disk unit, a display unit, a keyboard, a mouse, and so on. A computer program is recorded in the RAM or the hard disk unit. The devices implement their functions when the microprocessor operates in accordance with that computer program. The computer program in this case includes a combination of multiple instruction codes indicating commands to the computer for implementing predetermined functions.

(10) A part or all of constituents composing the devices in the above embodiment may be implemented by a single system large scale integration (LSI). The system LSI is a super functional LSI that is formed by integrating multiple constituents on one chip and is specifically a computer system configured to include the microprocessor, the ROM, the RAM, and so on. The computer program is recorded in the RAM. The system LSI implements its function when the microprocessor operates in accordance with the computer program.

Part of the constituents included in the above devices may be individually formed as chips, or one chip may be formed so as to include a part or all of the constituents.

The system LSI may be referred to as an integrated circuit (IC), an LSI, a super LSI, or an ultra LSI depending on a difference in the degree of integration. The technique of implementing an integrated circuit is not limited to the LSI and may be implemented by using a dedicated circuit or a general-purpose processor. A field programmable gate array (FPGA) that can be programmed after the manufacture of the LSI or a reconfigurable processor in which the connections and the settings of circuit cells disposed in the LSI can be reconfigured may be used.

In addition, if future integrated circuit technology replaces LSIs as a result of the advancement of semiconductor technology or other derivative technology, the functional blocks could be integrated using the future integrated circuit technology. Biotechnology can also be applied.

(11) A part or all of the constituents composing the above devices may be implemented by an IC card that is attachable and detachable to each device or by a single module. The IC card or that module is a computer system implemented by the microprocessor, the ROM, the RAM, and so on. The IC card or that module may include the above-mentioned super functional LSI. The IC card or that module implements its function when the microprocessor operates in accordance with the computer program. This IC card or module may have a tamper resistance.

(12) The present disclosure may be the above-described method. The present disclosure may also be a computer program implementing the method with a computer or may be a digital signal implemented by that computer program.

The present disclosure may be recorded in a computer-readable recording medium that can read the above-mentioned computer program or digital signal, that is, for example, a flexible disk, a hard disk, a CD-ROM, a magneto-optical disc (MO), a DVD, a DVD-ROM, a DVD-RAM, a Blu-ray (registered mark) disc (BD), a semiconductor memory, and the like. The present disclosure may also be the above-mentioned digital signal recorded in these record media.

The present disclosure may transmit the above-mentioned computer program or digital signal through an electric communication line, a wireless or wired communication line, a network such as the Internet, data broadcast, and so on.

The present disclosure may be a computer system provided with the microprocessor and the memory in which the memory records the above-mentioned computer program and the microprocessor operates in accordance with the computer program.

The program or digital signal may be implemented by another independent computer by transferring the program or digital signal by recording it in the recording medium or by transferring the program or digital signal through a network and the like.

(13) The above-described embodiment and modifications may be combined with each other.

The present disclosure can be applied to a system and the like that does not allow a data computing device to treat sensitive information on a user in plain text to protect privacy.

What is claimed is:

1. A method for a data providing device communicating with a plurality of data computing devices comprising:
obtaining a prediction model as a neural network;
converting each negative numerical value in a plurality of parameters included in the prediction model to a positive numerical value and converting each decimal value in the plurality of parameters included in the prediction model to an integer value, thereby reducing the time to obtain a converted prediction model, while maintaining the accuracy of prediction processing; and generating shared prediction models from the converted prediction model using a secret sharing method to be used for the prediction processing while concealing private input data of a user sensed by a sensor of a user terminal, wherein the generating of the shared prediction models from the converted prediction model using a secret sharing method occurs only after converting each negative numerical value in the plurality of parameters included in the prediction model to a positive numerical value; and transmitting the shared prediction models to a plurality of data computing devices, wherein the data computing devices
generate shared prediction results from the shared prediction models without determining the concealed private input data of the user sensed by the sensor, and
transmit the shared prediction results to a user terminal, which displays a decoded prediction result on a display or outputs the decoded prediction result from a speaker.

2. The method according to claim 1, wherein the prediction model is a binarized neural network including two values of 1 and −1 as the plurality of parameters.

3. The method according to claim 1, wherein the obtaining of the prediction model includes executing learning processing of the prediction model by using learning data collected in advance.

4. The method according to claim 1, wherein the converting includes adding a random value used in the secret sharing method to each negative numerical value in the plurality of parameters included in the prediction model.

5. The method according to claim 1, wherein the converting includes converting each numerical value in the plurality of parameters included in the prediction model to a pair including a sign part, indicating the sign of the numerical value by 0 or 1, and a numerical value part, indicating the absolute value of the numerical value.

6. The method according to claim 1, wherein the converting includes generating a new parameter from a part of the plurality of parameters.

7. The method according to claim 1, further comprising:
calculating a characteristic amount based on data obtained by sensing; and
sharing the calculated characteristic amount by the secret sharing method to obtain shared characteristic amounts.

8. The method according to claim 7, further comprising:
inputting the shared characteristic amounts to the shared prediction models to execute the prediction processing, wherein
the prediction processing includes non-linear processing in which when shared input to the non-linear processing is 0 or a positive numerical value, the shared input is converted to a shared value of 1, whereas when the shared input to the non-linear processing is a negative numerical value, the shared input is converted to a shared value of a positive numerical value corresponding to −1.

9. The method according to claim 1, wherein the secret sharing method used in generating the shared prediction models cannot be performed on negative numerical values in the plurality of parameters.

10. A system comprising:
a processor; and
a memory including at least one set of instructions that, when executed by the processor, causes the processor to perform operations including:
obtaining a prediction model as a neural network;
converting each negative numerical value in a plurality of parameters included in the prediction model to a positive numerical value and converting each decimal value in the plurality of parameters included in the prediction model to an integer value, thereby reducing the time to obtain a converted prediction model, while maintaining the accuracy of prediction processing;
generating shared prediction models from the converted prediction model using a secret sharing method to be used for the prediction processing while concealing private input data of a user sensed by a sensor of a user terminal, wherein the generating of the shared prediction models from the converted prediction model using a secret sharing method occurs only after converting each negative numerical value in the plurality of parameters included in the prediction model to a positive numerical value; and
transmitting the shared prediction models to a plurality of data computing devices, wherein the data computing devices
generate shared prediction results from the shared prediction models without determining the concealed private input data of the user sensed by the sensor, and
transmit the shared prediction results to a user terminal, which displays a decoded prediction result on a display or outputs the decoded prediction result from a speaker.

11. The system according to claim 10, wherein the processor obtains the prediction model as a binarized neural network, the binarization of the neural network shortening the time to convert the prediction model to a converted prediction model by converting each negative numerical value in a plurality of parameters included in the prediction model to a positive numerical value.

12. The system according to claim 10, wherein the processor converts each negative numerical value in the plurality of parameters included in the prediction model to the positive numerical value to obtain the converted prediction model by
i) determining a modulus used in a secret sharing method to be added to each negative numerical value in the plurality of parameters included in the prediction model based on a desired balance of prediction accuracy predicted by the processor and prediction speed with which the processor performs the conversion,
wherein the greater the numerical value of a parameter included in the prediction model, the higher the prediction accuracy of the processor, and
wherein the smaller the numerical value, the higher the calculation speed of the processor, and
ii) adding the determined modulus used in the secret sharing method to each negative numerical value in the plurality of parameters included in the prediction model.

13. The system according to claim 10, wherein the processor
generates a new parameter from a part of the plurality of parameters, encrypts the prediction model to generate the shared prediction models, and wherein the generating of the new parameter occurs before the encrypting of the prediction model, thereby reducing the time and increasing the speed for the prediction processing compared to generating the new parameter after encrypting of the prediction mode.

14. The system according to claim 10, wherein the processor inputs shared characteristic amounts of the private input data to the shared prediction models to execute the prediction processing, and the prediction processing includes non-linear processing in which when shared input to the non-linear processing is 0 or a positive numerical value, the shared input is converted to a shared value of 1, whereas when the shared input to the non-linear processing is a negative numerical value, the shared input is converted to a shared value of a positive numerical value corresponding to −1, thereby increasing prediction accuracy and increasing processing speed of the prediction processing.

15. The system according to claim 10, wherein the data computing devices generate the shared prediction results from the shared prediction models without determining the concealed private input data of the user sensed by the sensor, by using uniformization processing of data distribution of matrix product computing, thereby increasing the prediction processing speed.

16. The system according to claim 10, wherein the user terminal decodes the received shared prediction results to produce a decoded prediction result, and displays the decoded prediction result on a display or outputs the decoded prediction result from a speaker.

17. The system according to claim 10, wherein the sensor inputs the private input data into the user terminal rather than the user.

18. The system according to claim 10, wherein the sensor measures and inputs into the user terminal as the private user data vital information on the functioning of the user's body.

19. The system according to claim 10, wherein the sensor measures and inputs as the private user data location information of the user.

20. The system according to claim 10, wherein the sensor measures and inputs as the private user data log information that indicates the user's operation history of operating an electrical machine or a vehicle, or the user's purchase history information of purchasing products with the said of a computer.

21. The system according to claim 10, wherein the processor:

stores input learning data in the memory;

performs learning processing on the input learning data stored in the memory; and obtains the prediction model as the neural network from a result of the learning processing, wherein the converting operation converts the obtained prediction model to the converted prediction model, which is shared by the secret sharing method to obtain the shared prediction models.

22. The system according to claim 10, wherein the processor generates the converted prediction model from the prediction model using matrix product computing, uniformization processing of the data distribution of the matrix product computing, non-linear processing of the results of the uniformization processing, and maximum value searching of the results of the non-linear processing, and by converting each negative numerical value in a plurality of parameters included only in the non-linear processing to a positive numerical value to obtain the converted prediction model.

23. The system according to claim 10, wherein the secret sharing method used in generating the shared prediction models cannot be performed on negative numerical values in the plurality of parameters.

\* \* \* \* \*